July 18, 1967

G. ZELLER 3,331,260

STEERING WHEEL WITH WOOD-SURFACED RING AND
METHOD OF ITS MANUFACTURE

Filed Sept. 27, 1966

Inventor:
GREGOR ZELLER

BY *H. Edward Mestern*

INVENTOR.
GREGOR ZELLER

United States Patent Office 3,331,260
Patented July 18, 1967

3,331,260
STEERING WHEEL WITH WOOD-SURFACED RING AND METHOD OF ITS MANUFACTURE
Gregor Zeller, Obernau am Main, Germany, assignor to Lenkradwerk Gustav Petri A.G., Aschaffenburg, Germany
Filed Sept. 27, 1966, Ser. No. 582,423
Claims priority, application Germany, Mar. 23, 1966, L 53,162
16 Claims. (Cl. 74—552)

The invention relates to a steering wheel for automobiles having a ring with a wood surface, and to the manufacture thereof.

Steering wheels provided with wooden rings are known. They have the advantage of being made of a natural material which offers numerous variants, due to the many colors and grain or vein varities of wood. Also, the favorable coefficient of heat and the grain facilitate good grip on the wheel. For these reasons, the automotive industry has attempted for many years to utilize wood for steering wheel rings. That nevertheless wood is not employed very frequently is primarily due to the fact that it does not meet technological and economical requirements of modern automobile manufacture.

The known wooden steering wheel rings in general, have a veneer strip of approximately 4 mm. thickness. The strips first are rounded, then superposed, and the plurality of layers glued together. This aggregate then is attached to a reinforcing ring of steel. The disadvantage of these wheels most of all is the tendency of the rings, upon impact, to crack into numerous splinters of a length up to 20 cm. These splinters are prone to harm the driver and might even be fatal to him. Moreover, the method of fabricating these wheels permits solely a steel reinforcement of comparatively small diameter, i.e., reinforcement rings must be used which are apt to break under comparatively light loads. This, again, is a potential cause for accidents. Therefore, the wooden steering wheel rings hitherto employed do not comply with modern safety requirements. Another contributing factor to the non-use of wooden rings is the expense of the wood itself and of the manner of fabrication which precludes this use in mass production, limiting it to luxury vehicles and sports cars.

The object of the invention is the inexpensive manufacture of a steering wheel with rings having an exterior wood layer which is safe under modern traffic conditions and which permits the adaptation in style to the total layout of the interior of the automobile. In accordance with the invention, the steering wheel ring consists of a reinforcement ring made of metal, a hard rubber core attached thereto, and one or more superposed veneer sheets, vulcanized to the core.

Such a steering wheel has been found to meet all requirements in an ideal manner. It combines the advantages of known steering wheels provided with a hard rubber or plastic ring with those having a wooden ring, without assuming the drawbacks of these devices. The rings according to the invention are provided with a steel reinforcement ring strong enough to withstand all required loads so that fracturing of the steering wheel, as is common with known wooden wheels, is precluded. The hard rubber core also does not break under extreme load conditions or deformation, but in the worst case develops smooth cracks which do not constitute any harm for a driver involved in an automobile accident. The wooden veneer is integrally connected to the hard rubber core, thus does not loosen or peel off the core and cannot form harmful protruding splinters. Moreover, veneers of considerably lesser thickness can be used, compared to the known wooden steering wheel rings, so that even if the veneer came off the rubber core, no danger would exist. The veneer splinters snap under slightest load or stress and therefore cannot penetrate into the body of the driver. The decreased thickness of the veneer ring brings with it a decrease in the quantity of wood used, and this lessens the manufacturing costs, especially when fine woods are employed. Also, the installation of the veneer on the core may be executed directly, i.e., without prior shaping and/or bending. This simplifies the manufacture considerably and reduces the expenses to such an extent that the use of these rings in mass production becomes feasible. Furthermore, the wooden rings according to the invention have the advantages of the wooden wheels hitherto employed, i.e., good grip and good appearance.

The veneer can be vulcanized to the hard rubber core in such a manner that the grain or veins of the wood continue endlessly along the periphery of the wheel. On the other hand, single strips can be attached in segment form, and the grain or veins of these strips may also run in the direction of the periphery or at right angles thereto, e.g., at right angles.

Any conventional wood strip can be applied as the veneer. However, particularly suitable are those impregnated with synthetic resins which have been laminated of one longitudinally compressed and one vertically compressed wood strip. The impregnants may, e.g., be phenolic, urea or melamine-resins or others such as polyesters, etc. This difference in compression assures good flexibility and adherence even on uneven wheel surfaces, e.g., on wheels provided with gripping notches, and also compensation for stresses and strains occurring during vulcanization. Simultaneously, the phenolic resin impregnation assures excellent adhesion of the veneer to the hard rubber core and, in the case of a plurality of layers, on the lower veneer. The surface properties of the wheel are excellent, i.e., the wheel is smooth and has good grip.

According to the invention, the wheels can carry one or two veneer layers, and the individual layers may have grains running parallel or at right angles relative to each other.

The manufacture of the steering wheel according to the invention is carried out in conventional vulcanizers by embedding the steel reinforcing ring in the center of the rubber core. This assembly then is partly vulcanized. The veneer or veneers, ranging in thickness from 0.3 to 1 mm., had previously been steamed and may be preformed in suitable molds. If the finished wheel is provided with gripping notches, the molds, if used, are formed accordingly to impart the configuration to the veneers. The latter then are applied to the partly vulcanized core with or without a slight overlap, as desired. Thereafter, vulcanization is completed and an integral structural unit thereby obtained. It should be pointed out, however, that preforming in molds is not a strict requirement due to the thinness of the veneers.

It is expedient, especially in the embodiment wherein several resin-impregnated veneer strips are applied, to have the impregnating resin also in a semi-cured or "B-stage" state and to combine curing to the C-stage with the completion of the vulcanization.

The invention now will be further explained with reference to the accompany drawings. However, it should be understood that this is given merely by way of illustration, and not of limitation, and that numerous changes may be made in the details without departing from the spirit and the scope of the invention as hereinafter claimed.

Figure 1:
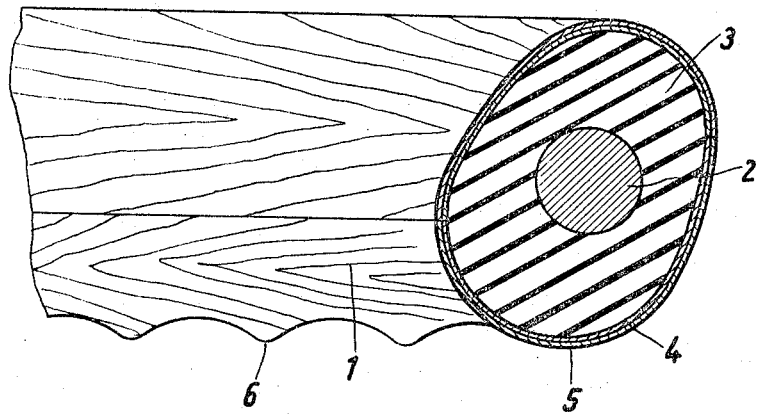
FIG. 1 is a partial section through a steering wheel ring.

Referring now to these drawings,

FIG. 1 illustrates a part of a steering wheel ring 1 consisting of a steel center ring 2 as reinforcement for the hard rubber core 3. The latter supports a lower veneer 4 and a top veneer 5. Notches are shown as 6.

Figure 2:
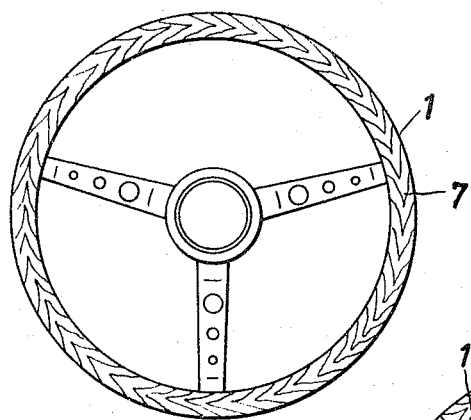
FIG. 2 is a top plan view of a steering wheel showing the vein of the veneer along the periphery of the wheel.
Figure 3:
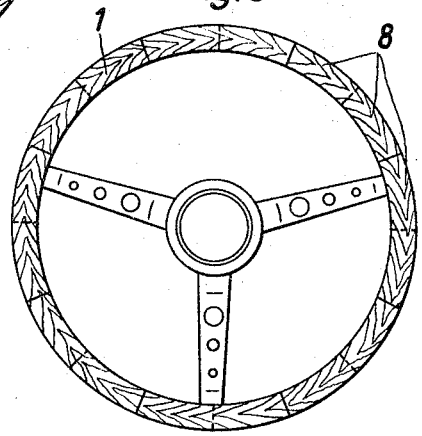
FIG. 3 is a similar top plan view as FIG. 2, but showing the veneer in sections.

The wheel shown in FIG. 2 illustrates a steering wheel 1 whereon the grain or vein 7 endlessly proceeds in the direction of the periphery of the wheel. FIG. 3 is similar to FIG. 2 except that the veneer consists of a plurality of segments 8.

Figure 4:
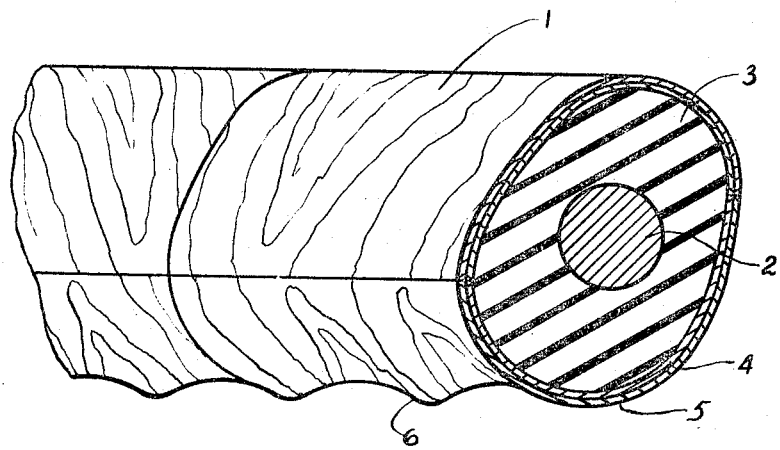
FIG. 4 is a partial section of a steering wheel ring with the wood grain at right angles to the periphery.
Figure 5:
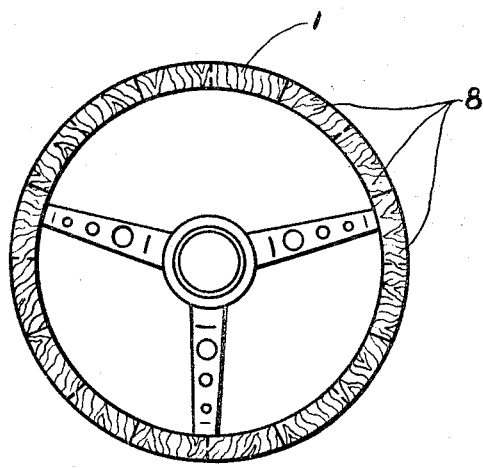
FIG. 5 is a top plan view of a steering wheel with the wood grain as in FIG. 4, the veneer being in sections.

FIG. 4 is similar to FIG. 1 except that right angled veins are illustrated therein. FIG. 5 shows veneer segments 8 whose veins are at right angles to the periphery of the wheel.

I claim as my invention:

1. A steering wheel ring comprising a hard rubber core; a steel reinforcing ring concentrically disposed in said core; and at least one wood veneer having a thickness of 0.3 to 1 mm. integrally combined with the surface of said core.

2. The ring as defined in claim 1, wherein said veneer has a grain running in the direction of the periphery of said ring.

3. The ring as defined in claim 1, wherein the grain of said veneer runs at right angles to the periphery of said ring.

4. The ring as defined in claim 1, wherein said veneer consists of a plurality of segments.

5. The ring as defined in claim 1, wherein said veneer is one continuous strip.

6. The ring as defined in claim 1, wherein said veneer is impregnated with a synthetic resin.

7. The ring as defined in claim 1, wherein two veneers are present; one lower one superimposed on said core; the second one on said lower veneer.

8. A process of manufacturing a steering wheel ring which comprises embedding a steel reinforcing ring substantially in the center of an unvulcanized hard rubber core; partly vulcanizing said core with said steel ring embedded therein; superimposing at least one wood veneer having a thickness of substantially 0.3 to 1 mm. on said partly vulcanized core; and completing vulcanization; thereby obtaining an integral structural unit.

9. The process as defined in claim 8, wherein said veneer strip is impregnated with a thermosetting synthetic resin.

10. The process as defined in claim 9, wherein said resin is in semi-cured state when superimposed; curing being completed simultaneously with the completion of the vulcanization.

11. The process as defined in claim 8, wherein said veneer strip, prior to its application to the core, is plastified by steaming.

12. The process as defined in claim 8, wherein said veneer strip is preshaped prior to application to the core.

13. The process as defined in claim 8, wherein said veneer is applied as a continuous strip.

14. The process as defined in claim 8, wherein said veneer is applied in a plurality of segments.

15. The process as defined in claim 8, wherein said veneer is superimposed with its edges end to end.

16. The process as defined in claim 8, wherein said veneer is superimposed with a slight overlap.

References Cited

UNITED STATES PATENTS

| | | | |
|---|---|---|---|
| 1,543,783 | 6/1925 | Medford | 74—552 |
| 1,586,737 | 6/1926 | Geyer | 74—552 X |
| 1,593,201 | 7/1926 | Tischer | 74—552 |

FRED C. MATTERN, JR., *Primary Examiner.*